ated Examiner—Lawrence E. Anderson

United States Patent [19]
Byers

[11] Patent Number: 4,791,559
[45] Date of Patent: Dec. 13, 1988

[54] HIGH-SPEED INSTRUCTION CONTROL FOR VECTOR PROCESSORS WITH REMAPPING

[75] Inventor: Larry L. Byers, Apple Valley, Minn.

[73] Assignee: Sperry Corporation, Blue Bell, Pa.

[21] Appl. No.: 928,931

[22] Filed: Nov. 10, 1986

Related U.S. Application Data

[63] Continuation-in-part of Ser. No. 809,358, Dec. 16, 1985, abandoned.

[51] Int. Cl.$^4$ .................. G06F 15/18; G06F 15/347
[52] U.S. Cl. .................................................. 364/200
[58] Field of Search ... 364/200 MS File, 900 MS File

[56] References Cited

U.S. PATENT DOCUMENTS 4,462,073  7/1984  Grondalski ..................... 364/200
4,591,972  5/1986  Guyer et al. .................... 364/200

*Primary Examiner*—Gary V. Harkcom
*Assistant Examiner*—Lawrence E. Anderson

*Attorney, Agent, or Firm*—John B. Sowell; L. J. Marhoefer; T. J. Scott

[57] ABSTRACT

An instruction flow control system includes an instruction buffer for receiving stored program instructions. A program address generator signals the instruction buffer for fetching the instructions. A translate RAM decodes the fetched instructions and a translate map gate array generates an address to the translate RAM in response to mapped and remapped instructions being fetched from the instruction buffer. The map gate array looks at an operation code included in the instructions and determines if remapping is required. If so, an address is generated including a constant providing a block of specific addresses and a variable providing a specific address within the block. The mapped instruction includes a seven bit operation code field and, in response to a mapped instruction being fetched, all of the seven bits are mapped directly to the translate RAM address. The address generated by the map gate array includes a most significant address bit and, in response to a remapped instruction being fetched, the gate array forces the most significant bit to 1 and generates an address by selecting a unique variable of the remapped instruction.

4 Claims, 4 Drawing Sheets

SPM BLOCK DIAGRAM

VPM BLOCK DIAGRAM

Fig. 4

| TYPE | OP CODE | INSTRUCTION | TRANSLATE RAM ADDRESS | | | | | | | |
|---|---|---|---|---|---|---|---|---|---|---|
| | | | 0 | 1 | 2 | 3 | 4 | 5 | 6 | 7 |
| REMAP VECTOR | 0 0 2 | SUM REDUCTION | 1 | 0 | 0 | 0 | 1 | 0 | $TI_1$ | $TI_2$ |
| REMAP VECTOR | 0 4 1 | COMPARE | 1 | 0 | 0 | 1 | 0 | 1 | $J0$ | $J1$ |
| REMAP VECTOR | 0 4 2 | ADD | 1 | 0 | 0 | 1 | 1 | 0 | $TI_1$ | $TI_2$ |
| REMAP VECTOR | 0 4 3 | SUBTRACT | 1 | 0 | 0 | 1 | 1 | 1 | $TI_1$ | $TI_2$ |
| REMAP VECTOR | 0 4 5 | DIVIDE | 1 | 0 | 1 | 0 | 0 | 1 | $TI_1$ | $TI_2$ |
| REMAP VECTOR | 0 4 6 | LOGICAL | 1 | 0 | 1 | 0 | 1 | 1 | $TI_0$ | $TI_1$ |
| REMAP VECTOR | 0 4 7 | SHIFT | 1 | 0 | 1 | 0 | 1 | 1 | $TI_0$ | $TI_1$ |
| REMAP VECTOR | 0 5 0 | CONVERT | 1 | 0 | 1 | 1 | $TI_1$ | $TI_2$ | $T3_0$ | $T3_1$ |
| REMAP VECTOR | 0 5 2 | CLS | 1 | 0 | 0 | 0 | 1 | 1 | $TI_1$ | $TI_2$ |
| REMAP SCALAR | 1 5 4 | MOVE | 1 | 1 | $S0$ | $S1$ | $S2$ | $S3$ | $S4$ | $S5$ |
| REMAP SCALAR | 1 5 5 | MOVE NEGATIVE | 1 | 1 | $S0$ | $S1$ | $S2$ | $S3$ | $S4$ | $S5$ |
| REMAP SCALAR | 1 5 6 | | 1 | 1 | $S0$ | $S1$ | $S2$ | $S3$ | $S4$ | $S5$ |
| REMAP SCALAR | 1 5 7 | | 1 | 1 | $S0$ | $S1$ | $S2$ | $S3$ | $S4$ | $S5$ |
| NORMAL | | ALL OTHERS | 0 | $F0$ | $F1$ | $F2$ | $F3$ | $F4$ | $F5$ | $F6$ |

| INSTRUCTION FIELD | INSTRUCTION BITS |
|---|---|
| $F0-F6$ (OP CODE) | 00 - 06 |
| $TI_0 - TI_2$ | 07 - 09 |
| $T3_0 - T3_1$ | 26 - 27 |
| $J0 - J1$ | 26 - 27 |
| $S0 - S5$ | 28 - 33 |

HIGH-SPEED INSTRUCTION CONTROL FOR VECTOR PROCESSORS WITH REMAPPING

This is a continuation-in-part of co-pending U.S. application Ser. No. 809,358 filed on Dec. 16, 1985 by Larry L. Byers for Instruction Flow Control For Processors now abandoned.

FIELD OF THE INVENTION

This invention relates generally to electrical computers and data processing systems and more particularly to programmable digital data processors which process vector instructions. More specifically, it relates to reducing pre-issue instruction decode logic.

BACKGROUND DESCRIPTION

In large computers such as scientific processors, stored program instructions are read into an instruction buffer. Instructions are fetched from the instruction buffer in response to a signal from a program address generator. The fetched instructions are applied to an instruction translate RAM which reads bits of pre-issue instruction decode information. Hold registers typically hold instructions just fetched from the instruction buffer until those instructions are mapped in the translate RAM and transferred into the instruction registers and decoder. An address into the translate RAM is the Operation Code of the instruction which allocates one location for the translation of each Operation Code.

Conventional instruction translate logic is a mass of interconnected complicated logic requiring many chips for the purpose of accomplishing pre-issue instruction decode. This arrangement typically causes many problems related to space requirements, cooling, power, interconnect limitations, performance and expense.

The foregoing illustrates limitations known to exist in present devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an instruction flow system including an instruction buffer for receiving stored program instructions. A program address generator signals the instruction buffer for fetching the instructions. An instruction translate RAM decodes the fetched instructions and a translate map gate array generates an address to the translate RAM in response to mapped and remapped instructions being fetched from the instruction buffer.

The foregoing and other aspects will become apparent from the following detailed description of the invention when considered in conjunction with the accompanying drawing. It is to be expressly understood, however, that the drawing is not intended as a definition of the invention but is for the purpose of illustration only.

BRIEF DESCRIPTION OF THE DRAWING

In the drawing

FIG. 4 is a table illustrating remapped instructions.

DESCRIPTION OF THE PREFERRED EMBODIMENT

Figure 1:
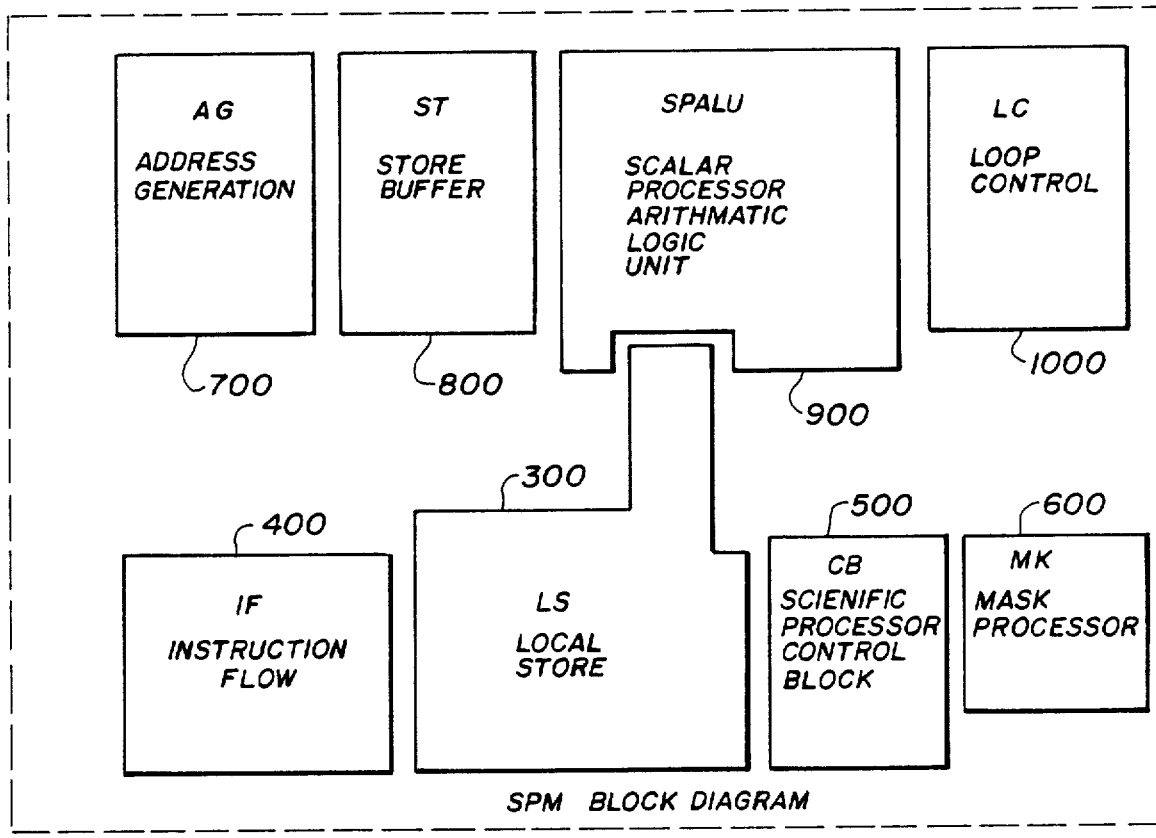
FIG. 1 is a simplified diagrammatic view illustrating an embodiment of the major sections of a Scalar Processor Module and a Vector Processor Module of a Scientific Processor.
Figure 1:
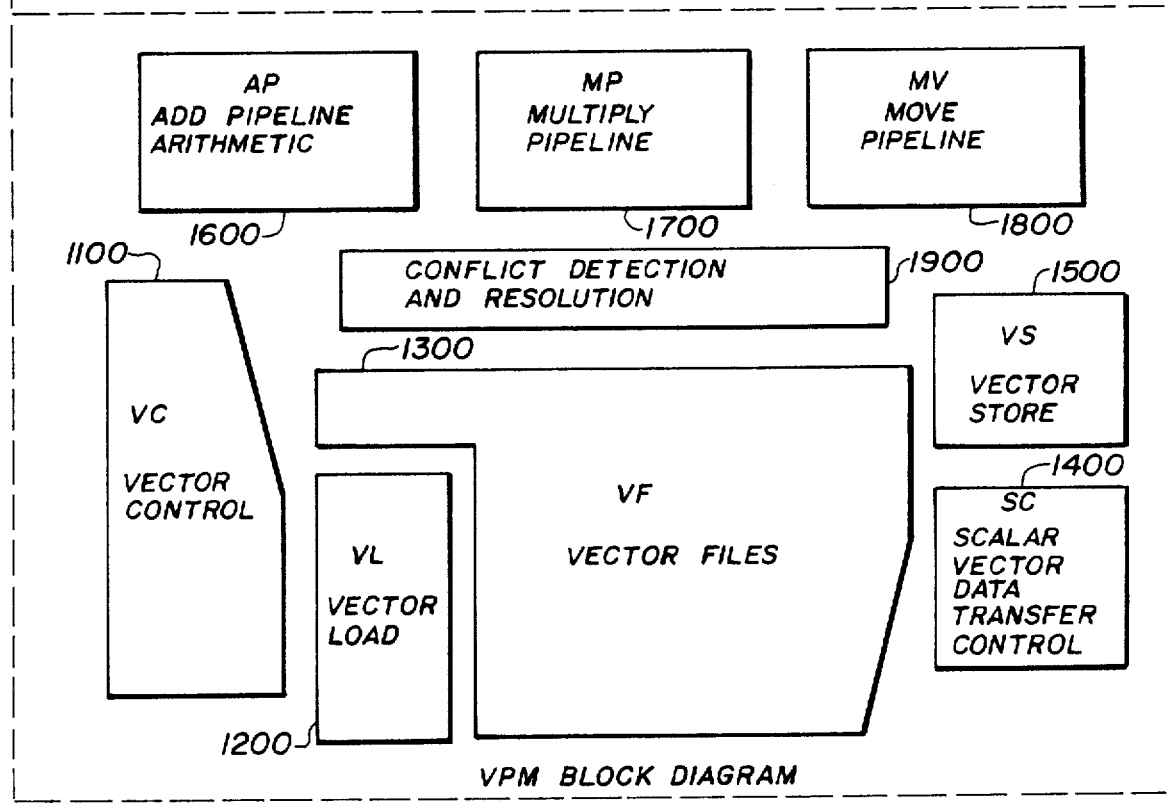

A Scientific Vector Processor (SVP) includes a Scalar Processor Module (SPM) and a Vector Processor Module (VPM). FIG. 1 is a block diagram of the major sections of the SPM and the VPM. This Figure illustrates the machine organization at the major section level. First, as to the section block diagrams in general, there are a total of seventeen major logic sections with eight sections in the SPM and nine sections in the VPM. Several additional auxiliary sections are present, such as the Scan Set and the external monitor, however, these will be referred to only briefly since they are not necessary for a complete understanding of the invention. Each section has a character identifier. This identifier is also used as a prefix for exchange for all logic signals originating in that section. In the SPM, break-out to the eight logic sections is on a functional basis. In the VPM, the sections are designated to accommodate explanation of the parallel pipelined operations of the vector processing sections. These sections provide architecturally required functions.

Referring now to the SPM block diagram of FIG. 1, there is illustrated the Instruction Flow Control (IF) section 400; the Local Store (LS) section 300; the Control Block (CB) section 500; the Mask Processor (MK) section 600; the Address Generation (AG) section 700; the Store Buffer (ST) section 800; the Scalar Processor Arithmetic Logic Unit (SPALU) 900; and the Loop Control (LC) section 1000.

The VPM sections are also shown in FIG. 1. These sections include the Vector Control (VC) section 1100; the Vector Load (VL) section 1200; the Vector File (VF) section 1300; the Scalar Vector Data Transfer Control (SC) section 1400; the Vector Store (VS) section 1500; the Add Pipeline (AP) section 1600, which includes an Arithmetic Logic Unit (ALU); the Multiply Pipeline (MP) section 1700; and the Move Pipeline (MV) section 1800. A special control section Conflict Detection and Resolution 1900 is utilized to resolve register conflicts between the various pipelined sections.

Figure 2:
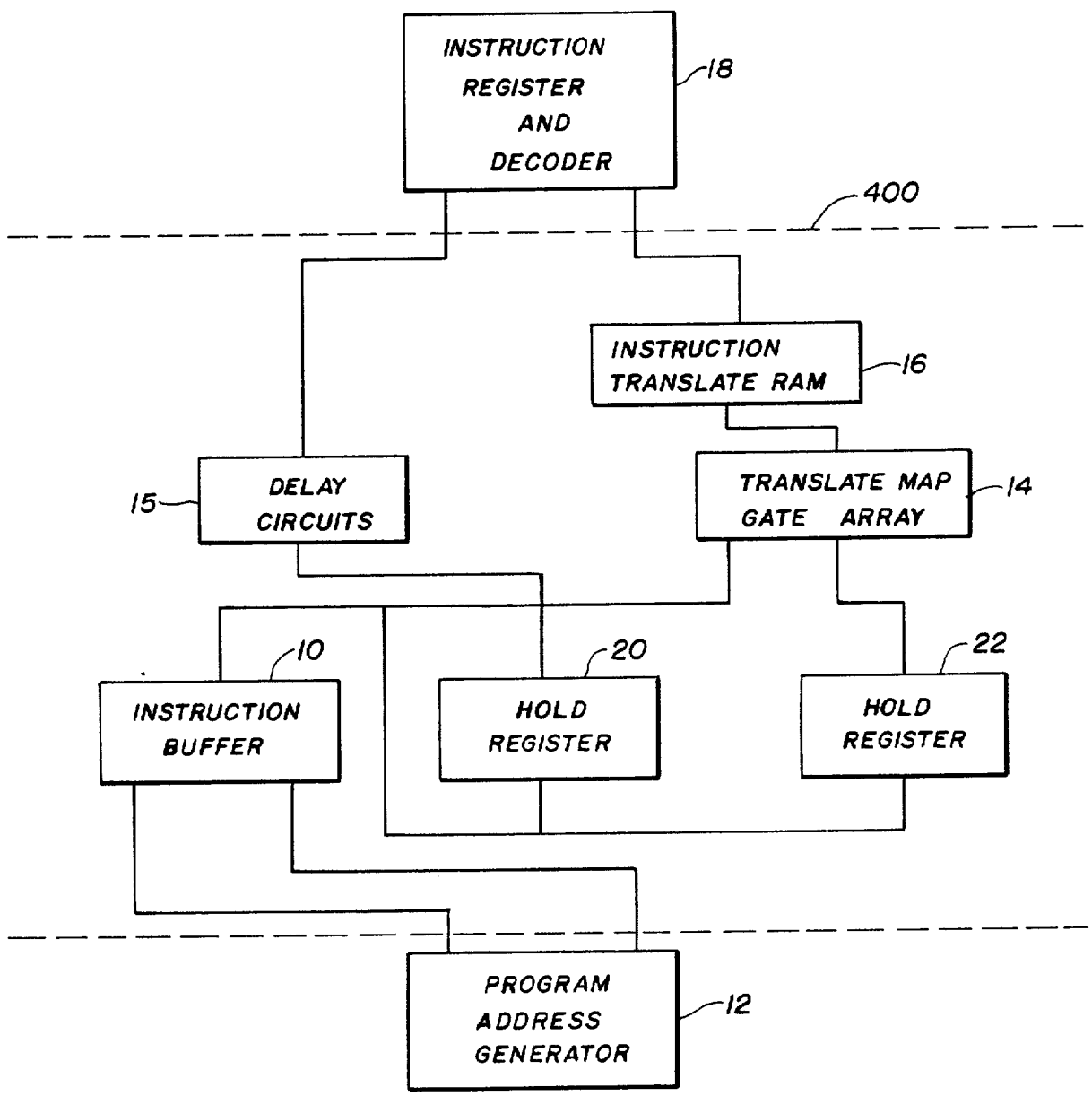
FIG. 2 is a diagrammatic view illustrating an embodiment of an instruction flow control section of a Scientific Processor.

IF control section 400, FIG. 2, comprises an instruction flow control system which transmits control information to, and receives response and sense inputs from other well known sections of the SVP such as AG section 700, LC section 1000, VC section 1100, etc. Stored program instructions are read into Instruction Buffer (IB) 10. Instructions are fetched from IB 10 in response to a signal from a Program Address Generator (PAG) 12. The fetched instructions are applied to a Translate Map Gate Array (TMGA) 14 which generates an address to the Instruction Translate RAM (ITR) 16. The ITR 16 reads up 96 bits of instruction decode information to the Instruction Register and Decoder (IRD) 18. Hold Registers (HR) 20, 22, hold instructions just fetched from IB 10 until they are mapped in the ITR 16 and transferred to the IRD 18 by way of TMGA 14, ITR 16 and delay circuits 15. Each instruction, and the specified operation requires one location in the ITR 16 for decode information.

The instruction decode device disclosed herein efficiently maps the address of the ITR 16 using the Op Code of the instruction, bits 00 to 06, or selected fields of specific instructions. By selecting the unique fields of a specific instruction, multiple decodes for an Op Code are provided.

TMGA 14 generates an address to ITR 16 in response to mapped and remapped instructions being fetched from IB 10. TMGA 14 looks at the instruction Operation Code (Op Code) and determines if remapping is required. In response to a remapped instruction, an address is generated including a constant providing a block of specific addresses and a variable providing a specific address within the block.

Figure 3:
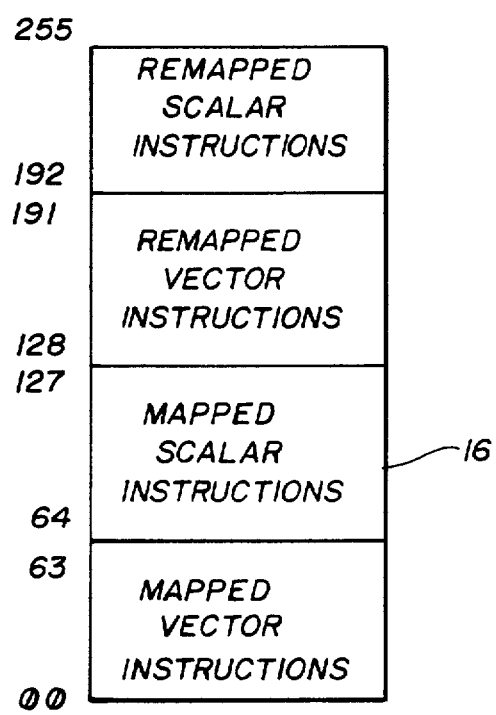
FIG. 3 is a diagrammatic view illustrating an embodiment the translate RAM of the instruction flow control section shown in FIG. 2.

Each time an instruction is fetched from the IB 10, the TMGA 14 generates an address for the ITR 16 to provide an efficient pre-issue instruction decode device. ITR 16, FIG. 3, is a 256-96 Translate RAM and includes four sections of 64 instruction decode entries each. The sections comprise one each for the following: mapped vector instructions; mapped scalar instructions; remapped vector instructions; and remapped scalar instructions. In operation, system 400 functions as follows:

(a) If the instruction is normally mapped, bits 00 to 06 of the 7 bit Op Code are mapped directly to the ITR 16 as follows:

TRANSLATE RAM ADDRESS BIT

00—Forced to 00
01 to 07—Instruction Bits 00-06

(b) If the instruction is a remapped instruction (see FIG. 4), the TMGA 14 forces the most significant address bit to 1 and generates an address by selecting a unique variable from the instruction. For example, referring to the Table of FIG. 4, it can be seen that the TMGA 14 provides a constant 1, 1 and 64 unique decodes for the MOVE instruction by selecting the 6 bit S field variable, S0-S5; the TMGA 14 provides a constant 1,0,0,0,1,0 and 4 unique decodes for the SUM REDUCTION instruction by selecting the 2 bit T field variable, T1-T2; and, if the remapped instruction is a VECTOR CONVERT instruction, TMGA 14 selects and catenates the T1 field bits 1 and 2, with the T3 field to provide sixteen unique VECTOR CONVERT instruction decodes based on the operand source/destination type conversion specified by the variables T1 and T3.

The foregoing has described an instruction flow control system including a device to reduce and simplify instruction decode logic. A unique TMGA 14 and a 256×96 ITR 16 provide an efficient pre-issue instruction decode device. This greatly simplifies and reduces pre-issue instruction decode logic by mapping the translate RAM address using the instruction Op Code and selected fields as variables. This unique IF section 400 includes an IB 10 for receiving stored program instructions. A PAG 12 generates signals enabling IB 10 to fetch instructions. The fetched instructions are applied to a TMAG 14 which generates an address to the ITR 16. The ITR 16 reads up 96 bits of instruction decode information to the IRD 18. HR 20, 22 hold instructions just fetched from IB 10 until they are mapped in the ITR 16 and transferred to the IRD 16. Section 400 avoids the typical problems commonly associated with previously known IF systems related to space requirements, cooling, power, interconnect limitations, performance and expense.

Having thus described the invention, what is claimed is:

1. An instruction flow control system for a main processor for processing mapped and remapped instructions, mapped instructions being where the address or instructions is not loaded directly into an active control register but is modified prior to loading, remapped instructions being where the instruction is modified at least twice, said instructions including operation codes based on which the determination is made whether to remap said instructions, comprising:

instruction buffer means connected to said main processor for receiving stored program instructions to be remapped;
   program address generator means connected to the instruction buffer means for fetching the program instructions to be remapped;
   map gate array means connected to said instruction buffer means for determining whether certain of said instructions from said instruction buffer are to be mapped or remapped and for instructions to be remapped generating an address including a constant address and a variable address which are indicative of a plurality of operation codes in responce to a single remap program instruction being fetched from the instruction buffer means; and
   a program instruction translate RAM connected to the output of said map gate array means for decoding each of said constant and said variable address into a plurality of operation code instructions for controlling said main processor, whereby a plurality of operation codes may be generated from a single instruction to be remapped by said map gate array means and said program instruction translate ram.

2. The system of claim 1 wherein said map gate array means examines the field of the operation code of the program instructions and determines if remapping is required, and in response to a remapping requirement, said address is generated including a constant address from a block of specific addresses and a variable address from a specific address within the block of variable addresses.

3. The system of claim 2 wherein the mapped instruction includes a seven bit operation code field and, in response to a mapped instruction being fetched, all of the seven bits are mapped directly to said translate RAM address.

4. The system of claim 2 wherein the address generated by the said map gate array means includes a most significant address bit, and in response to a remapped instruction being fetched sets the most significant address bit to 1 and generates said remapped address by selecting a unique variable indicative of the remapped code instruction.

* * * * *